Patented Dec. 8, 1953

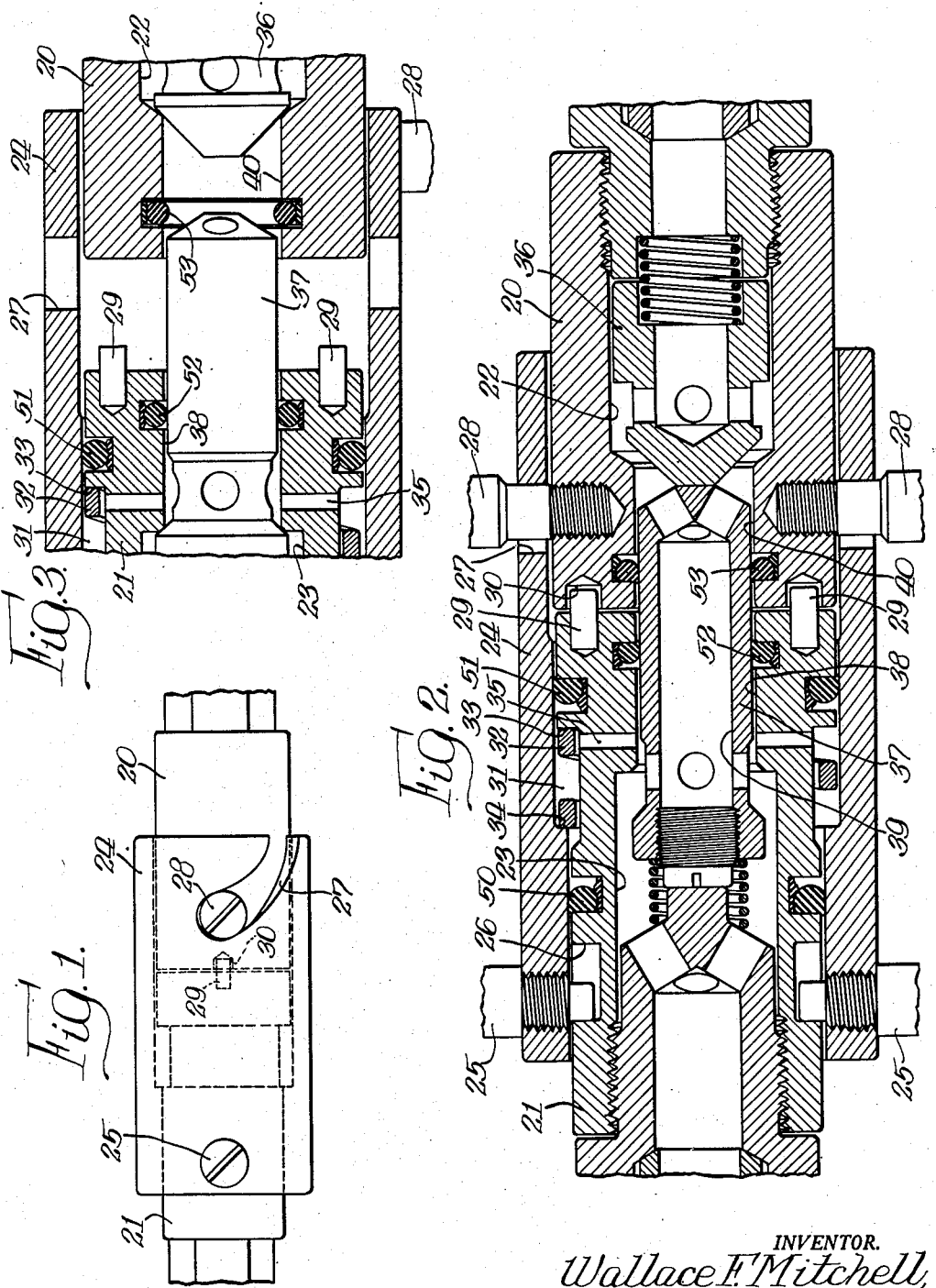

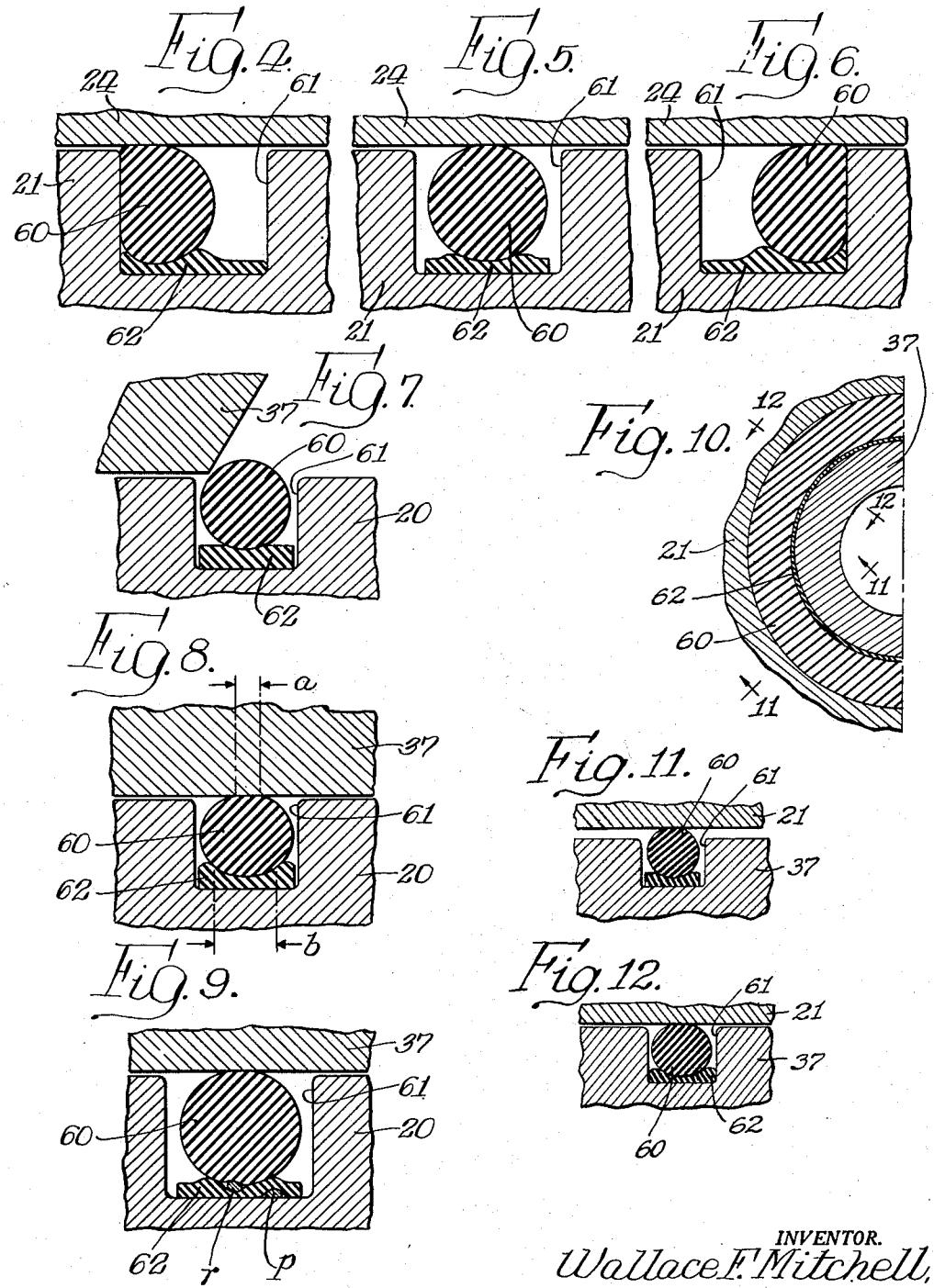

2,661,967

UNITED STATES PATENT OFFICE 2,661,967

FLUID SEAL

Wallace F. Mitchell, Chicago, Ill., assignor to M B G Corporation, Chicago, Ill., a corporation of Illinois Application November 17, 1949, Serial No. 127,825

1 Claim. (Cl. 286—26)

This invention has to do with fluid seals and relates particularly to a seal of the ring type for sealing two relatively movable members against leakage of fluid between such members.

In fluid seals of the type employed for sealing a relatively movable member, such as a piston, shaft, valve or the like, in an enclosing member, such as a cylinder, guide, chamber, or the like, sealing rings of the so-called O ring type are widely used. Such seal consists solely of a member of toroidal form, customarily called an O ring, seated in an annular sealing ring groove in one of the members (herein called the "seal-carrying member") in direct contact with the bottom wall of the groove and projecting slightly from the top of the groove for sealing contact with the other member (herein called the "contacting member"). O rings customarily are formed from relatively hard rubber material consisting of natural or synthetic rubber and a filler. Where natural rubber is suitable it is used but in many cases synthetic rubber is desirable because it is not so readily affected adversely by oil and heat as natural rubber. O rings formed from relatively hard rubber are employed in order to provide desired resistance to wear which results from the rubbing contact between the ring and the contacting member. In addition, the relatively hard O ring resists the tendency to extrude into the space between the seal-carrying and contacting members.

It has been found that seals formed in accordance with the practice prior to my invention have certain disadvantages. Among such disadvantages are that the relatively hard rubber material forming the ring has a comparatively low rate of recovery after distortion, especially where synthetic rubber is used. Hence after the ring has been distorted against one side of its groove by fluid pressure and such pressure is thereafter released the ring recovers its initial shape relatively slowly, with the result that during such recovery an appreciable leakage of fluid past the ring may take place. In addition, the relatively hard rubber material does not deform readily and hence should any particles of dirt or other foreign matter enter between the ring and the bottom wall of the groove in which the ring is located, the ring may be held away from the wall sufficiently to allow fluid to pass therebetween, especially where the fluid is under relatively low pressure.

It also has been found that in order to provide an effective seal, consideration must be given to variations in clearances between the movable members. Such clearances result, for example, from necessary manufacturing tolerances, slight manufacturing inaccuracies, nature of the surface finish on the members and distortion resulting from heat treating of the parts. In order to insure an effective seal, the seal is so designed that the O ring projects from its groove a sufficient distance to insure adequate contact with the contacting member even where the widest space occurs between opposite walls of the two members. While this projection or "interference" is made sufficiently great to provide for the widest clearance, it may happen that in a particular application the clearance is relatively slight and accordingly the O ring is flattened to a relatively great extent, thus resulting in excessive resistance of relative movement of the two members.

An object of this invention is to provide a fluid seal of the ring type which overcomes the aforesaid difficulties and provides an effective seal under all conditions customarily met in practice.

Another object is to provide a new and improved seal of the ring type.

Another object is to provide a new and improved fluid seal of the ring type which is simple to make and install, is long wearing and is non-leaking under conditions of both high and low fluid pressures.

A further object is to provide a fluid seal of the ring type which is nonleaking under low fluid pressures as well as under high fluid pressures, even where dirt or other particles of foreign matter may find their way into the seal and become lodged between the seal and the seal-carrying member.

A still further object is to provide a fluid seal of the ring type which is so formed as to accommodate it to relatively wide variations in fit or clearance between the relatively movable members such as those due to manufacturing difficulties, distortion resulting from heat treating, nature of the surface finish, and the like, without, however, producing excessive friction between the seal and the contacting member.

Another object is to provide a fluid seal of the ring type which, after distortion due to the application of fluid or mechanical pressure thereon, rapidly recovers its initial undistorted condition.

A further object is to provide a fluid seal of the ring type which is highly resistant to extrusion of the sealing member into the clearance space between the relatively movable members but which at the same time exhibits rapid recovery after fluid pressure distortion.

Other objects and advantages of the invention will appear from the following description taken in connection with the appended drawings wherein:

Figure 1 is a top plan view of a coupling shown by way of illustration as one device to which my invention is applicable and embodying a seal in accordance with the invention;

Fig. 2 is an enlarged longitudinal sectional view taken through the coupling of Fig. 1;

Fig. 3 is an enlarged, fragmentary, longitudinal sectional view taken through the coupling of Fig. 1 showing the coupling sections in partially separated condition;

Fig. 4 is an enlarged detail of Fig. 2 and showing, somewhat diagrammatically, one of the seals thereof under fluid pressure in one direction;

Fig. 5 is a view similar to Fig. 4 but showing the seal under no fluid pressure;

Fig. 6 is a view similar to Fig. 4 but showing the seal under fluid pressure in the opposite direction;

Fig. 7 is an enlarged detail of Fig. 3 and showing, somewhat diagrammatically, the contacting member displaced from contact with the seal;

Fig. 8 is an enlarged detail of Fig. 2 and showing, somewhat diagrammatically, the same portion of the structure as shown in Fig. 7, but with the contacting member in sealed position.

Fig. 9 is a view similar to Fig. 5 but showing, somewhat diagrammatically, a condition of the seal when foreign bodies are present;

Fig. 10 is an enlarged, fragmentary, transverse sectional view taken through a seal in accordance with the present invention and illustrating, somewhat diagrammatically, a condition wherein the members sealed are not truly concentric;

Fig. 11 is a longitudinal sectional view taken along line 11—11 of Fig. 10; and

Fig. 12 is a longitudinal sectional view taken along line 12—12 of Fig. 10.

The fluid seal in accordance with the present invention is adapted for application in a wide variety of mechanisms, as for example, for sealing a piston in a cylinder, a shaft in a guide, a valve in a valve chamber, or other uses where one member is relatively movable within another member and it is desired to provide a fluid seal between such members. The invention is adapted for application to uses where heretofore a ring seal of the so-called O ring type has been employed. However, for the purpose of illustrating the present invention it is shown and described herein in connection with a fluid coupling such as described and claimed in my copending application, Serial No. 755,134, filed June 17, 1947, for Fluid Coupling, which has matured into Patent No. 2,509,444, issued May 30, 1950. Before describing the seal of the present invention the aforesaid coupling will be briefly explained in order that the purpose, functioning and advantages of the seal may better be understood.

The coupling includes a first coupling section or plug body 20 and a second coupling section or valve body 21 adapted to be connected respectively to the ends of the pipe, hose, or conduit sections which are to be coupled together. The coupling sections 20 and 21 have, respectively, bores 22 and 23 extending therethrough respectively adapted to be placed in communication when the sections are connected as hereinafter explained.

The coupling sections 20, 21 are maintained in end-to-end abutment and axial alignment with their bores in communication by a sleeve 24 which is carried on the valve body 21 for axial sliding movement thereon, such movement being limited by studs 25 which are secured in the sleeve 24 and extend into slots 26 in the valve body 21. The sleeve 24 is formed with a pair of diametrically opposed arcuate slots 27 adapted to receive posts 28 which project radially from the plug body 20. The slots 27 are so formed that when the plug body 20 is inserted in the sleeve 24, as shown in Figs. 1 and 2 of the drawings, and the posts are disposed in the slots, the plug body 20 is restrained against axial withdrawal from the sleeve 24 except when the plug body is rotated about its axis. For the purpose of preventing rotation of the plug body relative to sleeve 24, except under the conditions hereinafter explained, a pair of pins 29 are provided which project from the end of the valve body 21 parallel to the axis thereof and are adapted to enter sockets 30 formed in the end of the plug body 20. When the pins are seated in the sockets 30, the plug body 20 and the sleeve 24, as well as the valve body 21, are held against relative rotation and the plug body is held in the sleeve 24.

In order to maintain the valve body 21 in its forwardmost position in the sleeve 24 and thus retain the pins 29 in the sockets 30, an annular chamber 31 is provided between the valve body 21 and the sleeve 24, in which chamber is disposed a spring 32 which bears at one end against a shoulder 33 formed on the valve body 21 and at the other end against a shoulder 34 formed on the sleeve 24. The annular chamber 31 is connected by a port 35 with the bore 23 of the valve body 21, thereby to admit fluid under pressure to the annular chamber 31 when the coupling is in coupled position. This fluid pressure augments the action of the spring in urging the valve body inwardly of the sleeve 24.

The ends of each section of the fluid line are sealed when the coupling is opened in order to prevent loss of fluid. To this end a spring-seated valve 36 is provided in the plug body. A spring-seated valve 37 having a fluid passage 39 therethrough is provided in the valve body 21 and is of such length that it is adapted to project through a reduced bore portion 38 in the valve body 21 and enter a reduced bore portion 40 in the plug body when the coupling sections are in coupled position, thus providing communication between the bores 23 and 22. The valves are adapted to mutually unseat each other when the coupling sections are in coupled position.

The annular chamber 31 is sealed against the loss of fluid by external type circular seals indicated generally at 50 and 51, which seals are constructed in accordance with the present invention and are hereinafter described more fully. A generally similar but internal type seal 52 is provided around the valve 37 and another generally similar external type seal 53 is provided in the plug body 20 for sealing the end of the valve 37 when it projects into the reduced bore portion 39.

The coupling is connected by inserting the plug body 20 in the sleeve 24 with the posts entering the slots 27 and turning the plug body 20 to advance it into the sleeve. When the end of the plug body contacts the pins 29, the valve body is forced outwardly in the sleeve against the pressure of the spring 32 to permit the advance of the plug body to be completed whereupon the pins enter the sockets and lock the sections against rotation and separation. The valve 37 is sealed in the valve body 21 at all times by the seal 52 and enters the seal 53 when the coupling is effected. During coupling the valves unseat each other and the port 35 is opened, admitting fluid to the chamber 31 and the fluid pressure exerted in the shoulders 33 and 34 augments the spring 32 in holding the valve body in its forward position. The seals 50 and 51 prevent escape of fluid from the chamber 31.

The coupling is uncoupled by exerting an axial pull in the two conduit sections which moves the coupling section 21 relative to the sleeve 24 and other coupling section 20. The studs 29 are disengaged from their sockets 30, thus permitting section 20 to rotate, whereupon the latter is free to move axially away from the other coupling section and out of the sleeve 24.

In accordance with the present invention the seal comprises a sealing ring 60 which may be similar to the usual O ring and which is disposed in a circumferential groove 61, preferably of rectangular cross-section, formed in the seal-carrying member. It will be understood that the groove 61 may be either formed externally in the inner member or internally in the outer member. An external type groove is illustrated by seals 50 and 51 and an internal groove seal is illustrated by seals 52 and 53. The O ring of the present invention is formed of a suitable rubber material which may include natural rubber which has been suitably treated to impart the desired hardness, but preferably I employ a synthetic rubber or rubber-like material which is suitably resistant to wear and at the same time resists the deteriorative effect of oil and grease and high temperature conditions such as commonly encountered in apparatus employing seals to which the present invention relates. Also the material is sufficiently hard to provide the necessary wear characteristics, to minimize the friction resulting from the sliding of the contacting member, and to prevent extrusion of the ring into the clearance space between the two members with which the seal is used. On the other hand, the material is sufficiently flexible to provide the desired sealing action. Preferably the rubber material from which the O ring is formed has a durometer hardness of around 70 and for best results such hardness should not be substantially less than 65.

Disposed in the groove between the O ring and the bottom wall of the groove is a ring 62 which preferably is of generally rectangular cross-section and of such thickness that it is slightly compressed between the O ring and the bottom wall of the groove and thus, together with the O ring, provides a complete seal between the two members being sealed. The seating ring 62 is formed of elastic sealing material of substantially lower durometer hardness than the O ring and preferably it has a durometer hardness of around 35 to 40. The seating ring 62 may be formed of natural rubber, but preferably is formed of a synthetic elastic material having the desired flexibility and elasticity but which at the same time is resistant to oils, greases and temperature effects.

The combined height of the seating ring 62 and the O ring 60 above the bottom of the groove 61 is such that the O ring projects above the open side of the groove sufficiently to provide the necessary interference for effective sealing, as illustrated particularly in Fig. 7 of the drawings.

The seating ring 62 is formed of a thickness relative to the diameter of the O ring section or thickness such as to permit a substantial deformation of the seal as a whole. While the thickness of the seating ring relative to the O ring may differ depending upon the particular application, I have found that excellent results may be obtained where the thickness is from approximately 20% to approximately 25% of the diameter of the O ring section. Owing to the much softer and more yielding nature of the seating ring 62, the greater proportion of the total deformation of the seal takes place in the seating ring 62 with very little deformation relatively of the O ring 60, as illustrated particularly in Fig. 9 of the drawings. Accordingly, the seal may be made to project a greater distance above the open side of the groove than in the prior art use wherein the O ring is seated directly on the bottom wall of the groove. The seal of the present invention is designed in each application to provide an interference in accordance with the extent of friction which is desired in such application. It has been found that generally the seal of my invention will provide from approximately 5% to approximately 15% more interference than prior art seals having the same friction.

In a seal of the prior art the O ring directly contacts the opposed metal surfaces of the bottom of the groove and the contacting member and accordingly must provide all of the distortion of the seal. The axial extent of the contact between the O ring and the seal-carrying member on the one hand and the contacting member on the other hand is equal. Accordingly, in order to prevent excessive friction it is necessary to so design the seal that the axial extent of each of the areas of contact is not so great as to impose excessive friction. This places a substantial limitation on the extent to which the O ring may be made to project from the open side of the groove.

On the other hand, in the seal of the present invention, inasmuch as the seating ring 62 takes most of the distortion, the axial extent of the area of contact between the O ring and the contacting member may be relatively short, as indicated by dimension $a$ in Fig. 9, while the axial extent of the area of contact between the O ring and the seating ring is relatively larger, as indicated by dimention $b$ of the drawings. Thus, in the seal of the present invention the O ring may be made to project a substantial distance above the open side of the groove and provide a substantial degree of interference, but at the same time the axial extent of the area of contact between the O ring and the contacting member may be relatively short, thus minimizing friction between the O ring and the contacting member.

The seating ring 62 in the seal of the present invention extends throughout a sufficient axial distance to provide a substantial area of contact with the O ring under all conditions of use. Preferably the seating ring 62 is of slightly lesser axial length than the groove when no fluid pressure is applied to the seal, as illustrated particularly in Fig. 5 of the drawings, so that when the seating ring is compressed by the O ring the former can expand axially and not interfere with movement of the O ring. The substantial axial extent of the seating ring insures that the area of contact between the O ring and the seating ring as well as the area of contact between the seating ring and the bottom wall of the groove will be of substantial axial extent and provide effective sealing. By reason of the relatively long axial extent of the area of contact and also the fact that the relatively soft seating ring conforms readily to the shape of the O ring, the seal is fully effective under conditions of low fluid pressure within the apparatus as well as under conditions of high fluid pressure. The seating ring is made sufficiently slightly less in diameter than the diameter of the bottom wall of the groove whereby the former grips the bottom wall sufficiently to insure sealing contact between the seating ring and the bottom wall of the groove and to prevent creep of the seating ring in the groove.

Preferably the groove is of greater dimension in an axial length than the corresponding dimension of the O ring, in accordance with standard practice so that a clearance space is provided on either side of the O ring between the latter and the corresponding side wall of the groove. (See for example Fig. 5.) The ratio of groove length in an axial direction to the diameter of the O ring section is similar to that employed in prior art seals consisting solely of an O ring disposed in a sealing ring groove. Accordingly, the O ring is permitted to move axially toward one side of the groove depending upon the direction of application of the fluid pressure on the O ring. By reason of the presence of the soft seating ring between the O ring and the bottom wall of the groove, the O ring may move to one side of the groove and be distorted into the upper corner defined by the side wall of the groove and the wall of the other member, with the O ring conforming closely to the portions of the walls adjacent the corner, without however decreasing the effectiveness of the seal. (See for example Fig. 4.) The soft seating ring 62 being under slight initial compression between the O ring and the adjacent member, accommodates itself to the change in position and shape of the O ring and effectively seals the space between the O ring and the bottom wall of the groove. When the pressure which forces the O ring to one side of the groove is released or is reversed in direction, the O ring may move out of the position at one end of the groove but the seating ring is of such nature that it tends rapidly to restore to its initial shape upon any change in the conditions which forced it out of its initial shape, and adapts itself rapidly to any change in shape in the O ring and thus maintains a perfect seal not only while the O ring is forced toward one side of the groove but during any movement out of such position or when the O ring is stationary in any new position.

Furthermore, the relatively hard rubber material from which the O ring is formed has a relatively low speed of recovery after being deformed. Accordingly, in the seal of the prior art when the ring is deformed against one side of its groove and into sealing relation with the clearance space between the members, and the fluid pressure is thereafter suddenly released or reversed, the ring moves away from the clearance space but does not conform itself immediately to the opposed walls of the members being sealed. Under such condition there is often a brief period when the seal is not effective, during which period fluid flows past the seal.

The relatively soft and flexible seating ring 62 of the present invention is readily distorted and thus, should any foreign particles find their way into the groove and enter between the seating ring 62 and the bottom wall of the groove (such as the particle indicated by p in Fig 11. of the drawings) or between the seating ring 62 and the O ring 60 (such as the particle r in Fig. 11 of the drawings), the seating ring will accommodate itself sufficiently to completely embed the particle therein and provide a complete and effective seal around the particle, thus preventing any leakage of fluid past the seal even at low fluid pressures.

An O ring employed alone, as in the prior art, also in many cases fails to completely seal the clearance space between the two members, inasmuch as small foreign bodies such as dirt, filings or chips may enter the groove through the clearance space between the members being sealed and work its way under the ring, as illustrated in Fig. 12 of the drawings. In such event, the foreign body or bodies may serve to space the ring from the bottom wall of the groove at one or more points, thus providing clearance spaces through which the fluid under pressure may readily pass, especially under low fluid pressure.

The soft sealing ring of the present invention is of sufficient thickness to permit substantial deflection and thus permit the O ring to adjust itself, without undue compression thereof, to a condition wherein the seal-carrying member and the contacting member are not truly concentric. It is often found in the case of members of the type to which the seal of the present invention is well adapted that owing to manufacturing difficulties, as for example the heat treating of the metal parts, the internal member may not be located truly concentrically within the external member, or one of the members may be slightly out-of-round, as illustrated particularly in Figs. 13 to 18 of the drawings. Where such a condition exists the clearance space between the seal-carrying member and the contacting member may be greater than desired at one portion of the periphery, as illustrated in Fig. 14, and less than desired at another portion of the periphery, as illustrated particularly in Fig. 15. In the seal of the present invention the seating member 62 is made sufficiently wide to accommodate the foregoing variation, whereby the O ring engages the contacting member over an axial extent substantially equal to that for which the seal is designed and the seating ring accommodates itself accordingly. For example, as illustrated in Fig. 14, where the clearance distance is excessive the seating ring is very little compressed, whereas at the portion of the apparatus where the clearance is less than normal the seating ring is more greatly compressed, as illustrated in Fig. 15.

A seal formed in accordance with the prior art is in many cases ineffective to seal the members where an off-center or out-of-round condition exists. In such case the excessive clearance between the members may be so great that the seal does not abut both the contacting member and the bottom wall of the groove and the seal is not fully effective, especially at low fluid pressures. On the other hand, at the portion of the apparatus where the clearance is less than normal the O ring is unduly compressed and excessive friction results.

It will be seen from the foregoing that the present invention provides a fluid seal which is non-leaking under low fluid pressures as well as high fluid pressures under not only normal conditions of use but many conditions which, while not desired, are nevertheless often encountered in use. The seal may be formed to provide a substantially greater interference than is possible in seals of the prior art, thus permitting use of the seal where substantial variations occur in machining tolerances or where out-of-round or nonconcentric conditions exist. Moreover, the seal has a relatively high rate of recovery and thus adapts itself very rapidly to changed conditions in the apparatus and does not leak even while such changes are taking place. Additionally, the relatively low contact area between the O ring and the contacting member permits the seal to be designed with relatively low friction.

I claim:

In fluid pressure apparatus a pair of relatively movable members having opposed wall surfaces, one of which members has an annular sealing ring groove concentric with and opening toward the adjacent wall of the other member, a fluid seal including an annular seating ring of relatively soft rubber material disposed entirely within said groove and seated against the bottom wall thereof, and an O ring of relatively hard rubber material and of less axial width than said groove disposed in said groove and against said seating ring and projecting from said groove into sealing contact with said other member, said seating ring being of initially less axial width than said groove but of sufficient axial width to extend under said O ring in sealing relation to said O ring and the bottom wall of said groove in all working positions of said O ring and being of substantially less radial extent than said groove so as to remain below the mid point of said O ring in all working positions of the latter.

WALLACE F. MITCHELL.

References Cited in the file of this patent

UNITED STATES PATENTS

| Number | Name | Date |
|---|---|---|
| 2,081,040 | King | May 18, 1937 |
| 2,373,443 | Armington | Apr. 10, 1945 |
| 2,437,586 | Aber | Mar. 9, 1948 |
| 2,437,814 | Hallen | Mar. 16, 1948 |
| 2,456,356 | Aber | Dec. 14, 1948 |
| 2,485,011 | Hiessen | Oct. 18, 1949 |